United States Patent
Jen

(10) Patent No.: US 6,620,362 B1
(45) Date of Patent: Sep. 16, 2003

(54) METHOD OF MANUFACTURING POLYESTER FIBER HAVING IMPROVED LIGHT FASTNESS

(75) Inventor: Zo-Chun Jen, Taipei Hsien (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 10/172,467

(22) Filed: Jun. 14, 2002

(51) Int. Cl.[7] .............................. B32B 3/20; C08G 63/02
(52) U.S. Cl. ..................... 264/176.1; 428/364; 528/298; 528/302; 528/308
(58) Field of Search ........................ 428/364; 528/298, 528/302, 308; 264/176.1

(56) References Cited

U.S. PATENT DOCUMENTS

| | | | |
|---|---|---|---|
| 4,110,301 A | * 8/1978 | Zannucci et al. | 524/291 |
| 4,189,476 A | * 2/1980 | Saito et al. | 514/129 |
| 4,789,382 A | * 12/1988 | Neumann et al. | 8/442 |

* cited by examiner

Primary Examiner—Samuel A. Acquah
(74) Attorney, Agent, or Firm—Bacon & Thomas

(57) ABSTRACT

A manufacturing method of polyester fiber having improved light fastness is provided, which comprises copolymerizing dicarboxylic acid, diol component and the ester forming monomer into a copolyester, wherein said ester forming monomer is present in an amount of 0.05 mole % above based upon the total dicarboxylic acid components and is represented by the following formula (1)

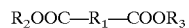

$$R_2OOC\text{—}R_1\text{—}COOR_3$$

(wherein R1 is a naphthalene ring, R2 and R3 are selected from the alkyl group having one to four hydrogen atoms or carbon atoms, and R2 is independent from R3, it can be the same or different with R3; the position of substitute group for the naphthalene ring on the ester forming monomer can be: -2,3-, -2,5-, -2,6-, -2,7-, -1,2-, -1,3-, -1,4-, -1,5-, -1,6-, -1,7-, -1,8-), subjecting the formed copolyester component to spin-draw process to obtain fiber which possess excellent light fastness after dyeing. Said fiber is suitable for automobile interior decoration, curtain and outdoor application and can keep fresh color, without fading, even being exposed to sunlight for a long time.

3 Claims, No Drawings

METHOD OF MANUFACTURING POLYESTER FIBER HAVING IMPROVED LIGHT FASTNESS

FIELD OF THE INVENTION

The present invention relates to a manufacturing method of polyester fiber having improved light fastness, particularly relates to a method comprising copolymerizing polyester and ester forming monomer having the structure of naphthalene ring into copolyester, subjecting the copolyester component formed to spin-draw process to obtain fiber which has excellent light fastness after dyeing, can prevent from the cracking caused by ultraviolet radiation, is suitable for the automobile interior decoration, curtain and outdoor application, and can keep fresh color, without fading, even being exposed to sunlight for a long time.

DESCRIPTION OF THE PRIOR ART

Polyester has excellent physical property, therefore is widely used in various application such as fiber, membrane, engineering plastic, etc., wherein the fiber can be used in home decoration, automobile interior decoration, industrial fiber, etc., besides garment application. However, with respect to the automobile interior decoration, as the final products made from fiber are frequently exposed to the sunlight, the high temperature and the ultraviolet radiation can cause the dyeing molecule in the fiber to decompose and crack, leading to fading.

In pursuit of Unproved polyester fiber, various proposals have been put forwarded to obtain desirable light fastness. For example, the U.S. Pat. Publication No. 4,789,382 disclosed that adding ultraviolet radiation absorber like benzophenone in the dye bath to improve light fastness. The U.S. Pat. Publication No. 4,110,301 disclosed a photo rearrangement compound having the ability of improving light fastness of polyester fiber; wherein the photo rearrangement compound can be added to the dye bath or added during the spinning process. The Japan laid open publication No. 1990-41468 disclosed that adding ultraviolet radiation absorber like benzotriazole in the dye bath to improve light fastness. Moreover, the Japan laid open publication No. 1992-339885 disclosed that adding ultraviolet radiation absorber like benzotriazole and benzophenone in the dye bath together to improve light fastness. Furthermore, the Japan laid open publication No. 1987-276018 disclosed that adding three kinds of components such as ultraviolet radiation absorber like benzotriazole, tetramethyl piperidine compound and aliphatic polyester polyol during the spinning process to improve light fastness. The Japan laid open publication No. 1992-240212 disclosed that adding ultraviolet radiation absorber like acrylic copolymer comprising 2-hydroxy-4-(methacryloyloxy ethoxy)benzophenone to improve light fastness. The U.S. Pat. Publication No. 4,189,476 disclosed that applying aromatic polyester comprising 10 to 23 mole % of 2,6-dioxynaphthalene to produce melting polyester fiber possessing high elon and high modulus properties, wherein the dosage of easter forming monomer like 2,6-dioxy naphthalene is high as 10 to 23 mole % and the melting polyester fiber is of high elon and high modulus. However the effect of above mentioned proposals are not desirable, there is a continuing need for improved polyester fiber. In the above described Japan laid open publication No. 1987-276018, combining tetramethyl piperidine compound with ultraviolet radiation absorber like benzotriazole as well as aliphatic polyester polyol are used to improve light fastness, however, there's no improvement to the phenomenon of bad sublimation degree of ultraviolet radiation absorber like benzotriazole, and as the aliphatic polyester polyol added is a low molecule substance, it lead to the disadvantage that the fiber has a lower physical property.

In the above described Japan laid open publication No. 1992-240212, an ultraviolet radiation absorber such as acrylic copolymer comprising 2-hydroxy-4 (methacryloyloxy ethoxy)benzophenone is applied, however the compound has undesired heat resistance, when it is added into the polymer during late polymerization process, the luster was changed to yellow sharply, leading to the fiber displaying yellowish luster. Furthermore, adding powdery ultraviolet radiation absorber during late polymerization process puts difficulties in the way of production and operation.

As for the method of adding ultraviolet radiation absorber such as benzophenone and ultraviolet radiation absorber such as benzotriazole in the dye bath, as the ultraviolet radiation absorber like benzotriazole has an undesired sublimation degree, and the ultraviolet radiation absorber like benzophenone has an undesired affinity for polyester fiber, effective absorption can not be achieved. In addition, both ultraviolet radiation absorber like benzophenone and ultraviolet radiation absorber like benzotriazole applied in the above described patents are yellow powder, this causes the fiber formed displaying light yellow color, therefore leading to the adverse effect of dyeing offset. Furthermore, the ultraviolet radiation absorber added is a small molecule substance, having not bonded with the polymer, therefore it can move to the fiber surface during the late processing stage and the application stage, causing pollution; after several times of application and washing, it has a lowered effective composition; or after long time exposure, it displays some adverse results, like lower effectiveness, etc. due to gradual decomposition.

OBJECT OF THE INVENTION

One object of the invention is to provide a method that can effectively improve light fastness of fiber, that has no problems of lowered effective composition and problems of pollution caused by ultraviolet radiation absorber moving to the fiber surface; furthermore, the fiber produced has excellent whiteness and fresh color after dyeing, without dyeing offset caused by ultraviolet radiation absorber displaying yellowish. Another object of the invention is to provide a polyester fiber that possesses excellent and permanent light fastness property with white appearance and fresh color after dyeing, and is suitable for automobile interior decoration and outdoor application.

DETAILED DESCRIPTION OF THE PREFERRED EMBODIMENT

As a result of an intensive study, the inventor proposes the present invention for the abovementioned objects, which relate to a fiber formed by copolymerizing the ester forming monomer monomer represented by formula (1) and polyester, said fiber possesses excellent light fastness.

$$R_2OOC-R_1-COOR_3 \tag{1}$$

(wherein $R_1$ is a naphthalene ring, $R_2$ and $R_3$ are selected from the alkyl having one to four hydrogen atoms or carbon atoms, and $R_2$ is independent from $R_3$, $R_2$ can be the same or different with $R_3$; the position of substitute group for the naphthalene ring on the ester forming monomer can be: -2,3-, -2,5-, -2,6-, -2,7-, -1,2-, -1,3-, -1,4-, -1,5-, -1,6-, -1,7-, -1,8-)

As the compound is bonded into the polyester molecule in the form of copolymerization, no such problems as pollution and undesired sublimation degree caused by compound moving to fiber surface therefore. Furthermore, as the final product is a copolyester, fiber produced by the copolyester has excellent physical property, without reduction of fiber physical property comparing with that of adding low molecule substance like aliphatic polyester polyol. The copolyester obtained has excellent whiteness, no normal yellowish problem caused by ultraviolet radiation absorber, and fiber formed can be dyed to fresh color without the defect of dyeing offset. Examples of the ester forming monomers of formula (1) used in the present invention include: 2,6-naphthalene-dicarboxylic acid, dimethyl-2,6-naphthalene-dicarboxylete, diethyl-2,6-naphthalene-dicarboxylate, dipropyl-2,6-naphthalene-dicarboxylate, di-n-butyl-2,6-naphthalene-dicarboxylate, 2,5-naphthalene-dicarboxylic acid, dimethyl-2,5-naphthalene-dicarboxylate, diethyl-2,5-naphthalene-dicarboxylate, dipropyl-2,5-naphthalene-dicarboxylate, di-n-butyl-2,5-naphthalene-dicarboxylate, and similar compounds etc.

The addition amount of the ester forming monomers of formula (1), based upon the total dicarboxylic acid components, is between 0.05~100 moles %. When the amount of the ester forming monomers of formula (1) is less than 0.05 moles %, the fiber thus obtained can not have good light fastness properties to fulfill the requirement in the car seat application. Of course, the higher amount of the ester forming monomers of formula (1) used, the better improvement can be achieved. The actual amount used should be dependent upon the light fastness requirements of fibers. Basically, the minimum amount used should be at least 0.05 moles %, based upon the total dicarboxylic acid components, for effective improvement of light fastness. On the other hand, when the addition amount of the ester forming monomers of formula (1) is more than 20 moles % and less than 80 moles % based upon the total dicarboxylic acid components, the copolyester formed is amorphous and can not go through the crystallization and drying operation necessary for the spinning process of fibers. Hence, from the view point of applications, the useful amount of the ester forming monomers of formula (1) is between 0.05~20 moles % and between 80~100 moles % based upon the total dicarboxylic acid components.

The addition manner of the above mentioned ester forming monomers of formula (1) can be accomplished by the commonly known skills used in the polyester production. For example: in one embodiment, feed the dicarboxylic acid monomers having naphthalene structure together with terephthelic acid and ethylene glycol into reactor to conduct the esterification reaction, followed by addition of commonly used antimony or germanium compounds as the polycondensation catalyst, then proceed with polycondensation to obtain the copolyester. In another embodiment, feed the ester dicarboxylane of monomers having naphthalene structure together with dimethyl terephthalate, ethylene glycol into reactor to conduct the ester exchange reaction, followed by addition of stabilizer, antimony or germanium compounds as the polycondensation catalysts, then proceed with polycondensation to obtain the copolyester. Yet in another embodiment, first conduct the reaction between terephthalic acid and ethylene glycol. After the conversion ratio has reached 85%, then feed the ester dicarboxylate of monomers having naphthalene structure into the reaction system; followed by continuation of esterification reaction until the conversion ratio has been over 96%, then add polycondensation catalysts and proceed with polycondersation to obtain the copolyester desired.

The polyester in the present invention can be produced from dicarboxylic acid/or its ester derivatives and diols. The substantial examples of dicarboxylic acid and its ester derivatives are as follows: aromatic dicarboxylic acids such as terephathlic acid, isophthalic acid, 5-sulfoisophthalic acid sodium salt, 5-sulfisophthalic acid tetra-n-butyl phosphonium salt, 5-sulfisophthalic acid ethyl tri-n-butyl phosphonium salt; aliphatic dicarboxylic acids such as adipic acid, heptandioic acid, octandioic acid, azelaic acid, sebacic acid; cycloaliphatic dicarboxylic acids such as 1,4-cyclohexane dicarboxylic acid; alkyl esters of the above mentioned acids. The substantial examples of diols are as follows: aliphatic diols such as ethylene glycol, 1,2-propanediol, 1,3-propanediol, 1,4-butanediol, 1,5-pentanediol, 1,6-hexanediol, iso-pentanediol; cyclic aliphatic diols such as 1,4-cyclohexanediol, 1,4-cyclohexanedimethanol; aromatic diols and ethylene oxide adducts of above mentioned diols such as p-dihydroxy phenyl, 2,2'-bis-(4-hydroxy phenyl) propane, bis-(4-hydroxy phenyl)naphthalene; polyglycols such as polyethylene glycol, polypropylene glycol, copolymer of ethylene glycol and propylene glycol, polytetramethylene glycol. If desired, the dicarboxylic acids and diols used in the present invention can be selected from any kind of the above mentioned diacids and diols and/or any combination of the above mentioned diacids or diols respectively.

For the end use applications, additives such as deluster agents, fluorescent brighteners, antioxidants, bactericides, disodorants, antistatic agents, flame retardants, far infrared radiating ceramic powders, can be incorporated into the copolyester if required.

The following is a brief description to the analytic method related to present invention.

(1) Intrinsic Viscosity (IV):

Determined by measurements on 3/2 by weight mixed solvent of phenol and 1,1,2,2-tetrachloroethane at 30° C.

(2) Luster:

The L-value and b-value are analyzed by the color difference meter of Type TC-1800B MK2 made by TOKYO DENSHOKU Company, Japan.

(3) Melting Point:

Determined by DSC (differential scanning calorimeter) of PERKIN ELMER at temperature increase rate of 20° C./min.

(4) Light Fastness:

Determined in accordance with Japanese Industrial Standard JIS L-0842 at temperature of 83° C., after 349 hours of irradiation by carbon-arc lamp. Light fastness is evaluated by using gray scale according to JIS L-0804 expressed by class.

EXAMPLES

The present invention will be exemplified by following embodiments, but it will be understood that the preferred embodiments are given for illustration of the invention and are not intended to be limiting thereof.

Example 1

Add 193.81 parts of dimethyl terephthalate, 0.244 parts of 2,6-dimethyl naphthalene dicarboxylate (in an amount of 0.1 mole % based upon the total dicarboxylic acid components), 124 parts of ethylene glycol and 0.078 parts of mangan acetate into the reactor to conduct the ester exchange reaction at the temperature of 165~230° C. When the distillate reaches to the theoretical amount, add 0.0192 parts of trimethyl phosphate, 0.0864 parts of antimony acetate and 0.4 weight % of deluster agent (based upon the total polyesters). Subsequently, raise the temperature of the reaction system to 280° C. and reduce the pressure gradually to 1 torr below to conduct polycondensation reaction. The reaction shall not stop until the torque of mixer reaches to the desired value, then use nitrogen to press the polymer into the water for cooling, finally pelletize the polymer into chips. The copolyeseter obtained has an IV value of 0.0640, a melting point of 253.5° C., L value of 78 and b value of 2.5. Melting spin the copolyester chips by extruder at spinning temperature of 290° C. and winding speed of 3200 meters/min, producing 125 denier/36 filament of partially oriented yarn, which is subsequently produced to flat spin of 75 denier/36 filament. Weave the flat spin to plain cloth and dye it, the light fastness measured is Class 3.

Condition of dyeing:

Dyestuff: SUMIKARON YELLOW SE-3GL 2% o.w.f.

Bath ratio: 1:50

Temperature of dyeing: 130° C.

Time of dyeing: 60 minutes

Example 2

Example 1 was repeated except that the adding amount of 2,6-dimethyl naphthalene dicarboxylate was 0.5 mole %. The light fastness measured is Class 3.

Example 3

Example 1 was repeated except that the adding amount of 2,6-dimethyl naphthalene dicarboxylate was 1.0 mole %. The light fastness measured is Class 3~4.

Comparative Example

Example 1 was repeated except that the adding amount of 2,6-dimethyl naphthalene dicarboxylate was 0 mole % and the adding amount of dimethyl terephthalate was 194 parts. The polyester obtained has the L value of 78 and b value of 2.0 and Class 2 of light fastness.

Example 4

Example 1 was repeated except that the adding amount of 2,6-dimethyl naphthalene dicarboxylate was 10.0 mole %. The copolyester obtained has IV of 0.615, melting point of 228° C., L value of 78 and b value of 2.0. Take 1 part of the copolyester obtained with 9 parts of unmodified polyester without 2,6-dimethyl naphthalene dicarboxylate and mix them evenly in the form of chips blends (final content of 2,6-dimethyl naphthalene dicarboxylate is 1.0 mole %). Spin, draw, weave and dye the blends following the steps of Example 1. Measured light fastness of polyester obtained is Class 3~4.

Example 5

Example 4 was repeated to produce 10.0 mole % of 2,6-dimethyl naphthalene dicarboxylate. Take 1 part of the copolyester obtained with 1 part of unmodified polyester without 2,6-dimethyl naphthalene dicarboxylate and mix them evenly in the form of chips blends (final content of 2,6-dimethyl naphthalene dicarboxylate is 5.0 mole %). Follow the steps of Example 4. Measured light fastness of polyester obtained is Class 4.

Example 6

Example 4 was repeated except that 10.0 mole % of 2,6-dimethyl naphthalene dicarboxylate was woven into filament directly. The light fastness measured is Class 4~5.

Example 7

Example 1 was repeated except that the adding amount of 2,6-dimethyl naphthalene dicarboxylate was 244.21 parts, i.e., 100 mole %. The copolyester obtained has IV of 0.485, melting point of 265° C., L value of 77 and b value of 2.2. The light fastness measured is Class 5.

Example 8

Example 7 was repeated except that the adding amount of 2,6-dimethyl naphthalene dicarboxylate was changed to 92 mole % of 2,6-dimethyl naphthalene dicarboxylate and 8 mole % of dimethyl terephthalate. The copolyester obtained has IV of 0.512, melting point of 251° C., L value of 77 and b value of 1.6. The light fastness measured is Class 5.

Comperative Examples 2

Example 6 was repeated except that the adding amount of 2,6-dimethyl naphthalene dicarboxylate was changed to 21 mole %. The copolyester obtained is amorphous, can not go through the crystallization and drying process to produce fiber.

Comperative Examples 3

Add 1.5 weight % of ultraviolet radiation absorber like acrylic copolymer comprising 2-hydroxy-4-(methacryloyloxy ethoxy)benzophenone (BASF UVA635L), polyester obtained displays obvious yellowish with L value of 65 and b value of 13.

What is claimed is:

1. A method of manufacturing polyester fiber having improved light fastness, comprising: copolymerizing dicarboxylic acid, diol component and the ester forming monomer into a (copolyester, wherein said ester forming monomer is present in an amount of 0.05 mole % and above based upon the total dicarboxylic acid component and is represented by the following formula (1)

$$R_2OOC-R_1-COOR_3 \quad (1)$$

(wherein $R_1$ is a naphthalene ring, $R_2$ and $R_3$ are selected from the alkyl group having one to four hydrogen atoms or carbon atoms, and $R_2$ is independent from $R_3$, it can be the same or different with R3; the position of substitute group for the naphthalene ring on the ester forming monomer can be: -2,3-, -2,5-, -2,6-, -2,7-, -1,2-, -1,3-, -1,4-, -1,5-, -1,6-, -1,7-, -1,8-), subjecting the formed copolyester composition to spin-draw process to obtain fiber.

2. A method of manufacturing polyester fiber according to claim 1, wherein the content of ester forming monomer of formula (1) based upon the total dicarboxylic acid components is between 0.05 mole % and 20 mole %.

3. A method of manufacturing polyester fiber according to claim 1, wherein the content of ester forming monomer of formula (1) based upon the total dicarboxylic acid components is between 80 mole % and 100 mole %. Fastness.

* * * * *